Nov. 4, 1941.         R. C. BENNER ET AL         2,261,639
                         OXIDE PELLET
                      Filed July 2, 1937

INVENTORS
RAYMOND C. BENNER
JOHN CHARLES MC MULLEN
BY
ATTORNEY.

Patented Nov. 4, 1941

2,261,639

UNITED STATES PATENT OFFICE 2,261,639

OXIDE PELLET

Raymond C. Benner and John Charles McMullen, Niagara Falls, N. Y., assignors to The Carborundum Company, Niagara Falls, N. Y., a corporation of Delaware Application July 2, 1937, Serial No. 151,660

17 Claims. (Cl. 23—142)

This application is a continuation-in-part of our copending application Serial No. 27,797, filed June 21, 1935, and relates to pellets of hard refractory crystalline materials in mechanically strong and substantially solid form and to methods of making the same. The resultant products are characterized by being approximately spherical in shape, predominantly crystalline, of high crushing strength and substantially solid, i. e. free from pores.

Methods have hitherto been known for manufacturing spherical pellets of fused alumina and the like, but these have been hollow globules with relatively thin walls which are deficient in strength for many purposes and which are relatively readily attacked by fluxes due to the large exposed surface per unit of weight. It has also been proposed to water quench molten refractory material in order to arrest crystal growth, the product being mechanically weak and fragile, and composed of cryptocrystalline material and glassy matrix. Certain pieces of the material so formed are more or less globular pellets but these are not suited for the purposes of the present product and are not to be confused therewith.

Our new product is far stronger and more inert and so may be more advantageously used for many purposes as will hereinafter appear. It is furthermore composed of relatively large, well-developed crystals with practically no glassy matrix present, the crystals being well-knit together and interlocked to form a strong, solid pellet. Moreover, we are not limited to alumina but are also able to produce solid pellets of spinel, chromite, mullite and the like.

In carrying out our invention we fuse the material from which it is desired to make pellets, using preferably a furnace of the type well-known in the manufacture of fused aluminous abrasives. The material is melted in such a furnace and reduction of oxides of iron, silicon and other undesired metals is also carried out therein as completely as may be desired. The reduced metal is allowed to sink to the bottom of the melt and the remaining molten material is then caused to flow from the furnace in a thin stream. This effluent stream flows past one or more high pressure air or other gaseous jets directed at approximately right angles to it. The air jet breaks the molten stream into droplets and carries these through the air for several feet before dropping them. The droplets solidify before striking and thus have a roughly spherical form. This part of the process is also utilized in the production of the hollow or porous globules above referred to.

We have discovered, however, that the addition of an alkaline oxide, such as potassium or sodium oxide (usually in the form of carbonate), to the material to be melted, has a very striking effect in making the pellets far less porous. When using alumina as a raw material for example, the addition of as little as 1% of $Na_2O$ changes the structure of the pellets from a very open, thin-walled bubble to an almost solid pellet composed chiefly of alpha alumina crystals but containing also about 15% of beta alumina. When 5% $Na_2O$ is used, the pellets are of substantially completely beta alumina and are completely solid.

This effect of the addition of soda also follows in the case of other crystalline refractory materials which, without the soda, form either hollow thin-walled globules or multi-cellular porous pellets, as for instance magnesia spinel, chromite and mullite. With certain materials such as forsterite, somewhat higher percentages of alkali are required to produce solid pellets than are required with alumina, but the effect of the alkali is to decrease the porosity in both cases.

We have not determined the underlying cause of the fact that pellets containing soda are solid, while those which do not are hollow or extremely porous. It is apparently not a question of length of softening temperature range however, as the materials show little or no tendency to form threads when blown (such as form in the case of slag wool, etc. where the ingredients have a long softening range). It may be that the effect of the alkaline oxide may be to lower the surface tension during the molten period so as to permit the escape of the gas from the interior of the pellet or sphere and increase solidity and cause formation of such solid pellets. Whatever may be the reason, the result of the presence of the alkali is to produce solid rather than hollow pellets.

It has been our experience that about 5% of sodium oxide is sufficient to cause the pellets of alumina to be solid, although even as low as 1% has a considerable effect and up to 10% may be used without detriment unless the pellets are desired for service at very high temperatures.

The size of the pellets may be regulated by adjusting the velocity of the gas jet impinging on the stream of molten material, or to a less extent by varying the angle of impingement. The higher the velocity, the finer will be the pellets produced. A pressure of 100 lbs. per square inch with a jet one-quarter (¼) inch in diameter with a proper control valve is, in general, satisfactory. This control of size of particles is quite important since for many applications, closely sized non-angular particles are desired, and the correct size must be made at the outset since the advantage of the round shape is lost if any attempt is made to crush the particles.

It is also desirable that the melt be allowed to degasify as completely as feasible before pouring, i. e. to rid itself of entrapped gases resulting from decomposition of the ingredients of the mix or from oxidation of the carbon electrodes. Unless this is done, it is more difficult to control the size of the pellets and their porosity tends to slightly increase.

In making pellets of mullite and other silicates, it is important to avoid an excess of silica as such silica as is not included in crystalline compounds (e. g. mullite) tends to form a glass which blows into strings rather than pellets. Even with some excess silica, however, the presence of 5% of soda is beneficial in reducing the percentage of strings and increasing the yield of solid pellets.

According to our method of breaking up the effluent stream of molten refractory material into small rounded pellets as it comes from the furnace, it is essential that the material be broken up and dispersed and allowed to cool without being shocked by too sudden a cooling action such as by dropping in water. If the particles are cooled too quickly the pellets do not form mature crystals, but their crystalline growth is arrested so as to produce a cryptocrystalline material (the crystals being submicroscopic in size) which also contains considerable quantities of glassy material. Such is the case when the pellets are water quenched. By the use of an air or other gaseous blast, the stream of molten material is broken up without too rapid a cooling action or shock.

Figure 1:
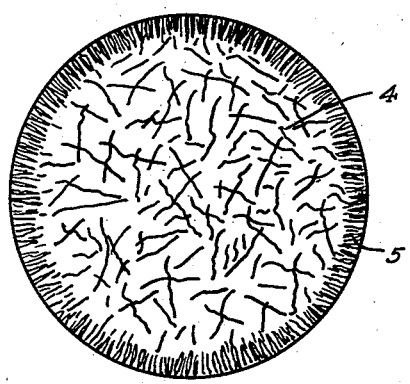
Figure 1 is a graphic representation of a solid pellet made according to the present invention.

In Figure 1, 4 is the interlocking, fully developed, uniform crystal structure which constitutes the body of the pellet with the exception of a narrow band 5 of slightly smaller crystals which are roughly perpendicular to and just beneath the outer surface of the pellet. The pellet, as will be noticed, is practically free from glass.

Figure 2:
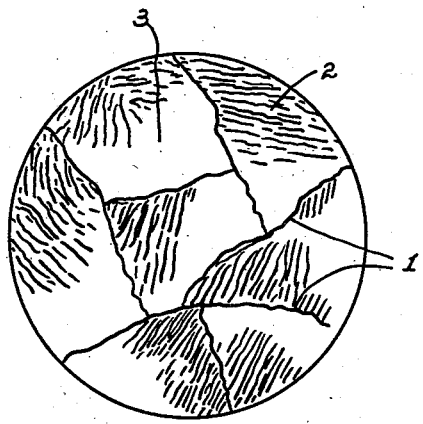
Figure 2 is a graphic representation of a pellet which has been cooled by quenching in water.

In Figure 2, the numerous cracks and fissures 1, which cause the pellets to be weak and fragile, are shown as well as the large amount of glass present in the pellet and shown by the clear areas 3. The crystalline material 2 is shown in the arrested form of submicroscopic or cryptocrystalline size.

These figures, in each case, represent pellets characteristic and typical of the respective processes.

Pellets made by our process have numerous uses dependent upon their composition, shape and strength. When bonded with clays and feldspar they may be made into tile for use as filter or diffuser plates. Such tile have much lower resistance to the passage of air or water through them than do similar tile made of angular particles of identical chemical composition (i. e. lower head loss). In forming filter tile or diffuser plates, it is desirable to maintain a uniform open structure and even porosity throughout the tile. This is, to a large extent, dependent upon the uniformity of shape of the particles which go to make up the tile. In using round spheres, such as are obtained by the present process, it is possible to attain a uniformity of porosity that not only exists in each individual tile, but can be more easily duplicated from tile to tile than if an irregular heterogeneous group of angular shapes were used in the tile.

Pellets may also be used in the manufacture of refractories and as polishing media where their great hardness, toughness and lack of angular corners proves advantageous. They may also be used as packing media in absorption towers and other contact processes in the chemical industry.

They may also be used to advantage in abrasive work by crushing them in rolls to form angular fragments of great toughness and strength which may be utilized in the manner of ordinary abrasive granules. The uniform crystallinity of these products makes them unusually adaptable for the production of uniform and fully duplicable abrasive bodies.

Our pellets are in all cases composed of crystalline refractory oxides including a minor percentage of soda or its equivalent. In general, they are composed primarily of oxide compounds of aluminum, although as noted they may also be made of non-aluminous materials.

Other methods of dispersing the material to form pellets may be employed, such as pouring the molten material onto a rapidly rotating metal disc coated with suitable refractory material, although the solidification and cooling should always take place while the pellets are suspended in a gaseous medium such as air. We, however, prefer the blowing method as offering better means for controlling particle size.

When referring to the pellets as being mechanically strong we mean, for example, that they do not easily shatter or crumble if placed on a hard surface and pressed upon by hand with an ordinary knife blade. In order to more clearly indicate the actual strength of our particles from the intended meaning of the phrase "mechanically strong" as used in the specification and claims, the following comparative strengths of air-cooled versus water-quenched mullite pellets are offered by way of illustration, wherein the pellets are from 10 to 12 mesh in size. The average crushing strength of the water cooled pellets was 6.3 pounds, while that of the air cooled pellets was 41.6 pounds. The strongest water cooled pellet broke at 14.2 pounds and the weakest air cooled one broke at 31.0 pounds. This strength permits the incorporation of the pellets in ceramic bodies without their being crushed in molding even though this is done under a pressure of many hundred pounds per square inch. Hence, in bodies or masses where it is important that the pores be open and not blocked by fragments of crushed granules, the advantage of the present product is outstanding.

Having thus described our invention, what we claim is:

1. A mechanically strong, substantially spherical pellet substantially solid throughout composed of crystalline refractory oxides and including a minor percentage of an alkali oxide, the size of the crystals of said pellet being such that the crystalline character of said pellet can be readily identified.

2. A substantially spherical, mechanically strong, non-porous pellet substantially solid throughout composed of crystalline refractory oxides and comprising 1 to 10 per cent of sodium oxide, the size of the crystals of said pellet being such that the crystalline character of said pellet can be readily identified.

3. A substantially spherical, mechanically strong, non-porous pellet substantially solid throughout composed of crystalline refractory oxides and comprising approximately 5% of sodium oxide, the size of the crystals of said pellet being such that the crystalline character of said pellet can be readily identified.

4. A mechanically strong spherical particle substantially solid throughout composed principally of crystalline aluminous material and comprising 1 to 10% of sodium oxide, the size of the crystals of said particle being such that the crystalline character of said particle can be readily identified.

5. A mechanically strong spherical particle substantially solid throughout composed principally of beta alumina, the size of the crystals of said particle being such that the crystalline character of said particle can be readily identified.

6. A mechanically strong spherical particle substantially solid throughout composed principally of crystalline aluminous material and comprising a minor percentage of an alkali oxide, the size of the crystals of said particle being such that the crystalline character of said particle can be readily identified.

7. A mechanically strong, substantially spherical pellet substantially solid throughout composed of crystalline refractory oxides and including a minor percentage of an alkali oxide, the size of the crystals of said pellet being such that the crystalline character of said pellet can be readily identified, and further characterized by having a crushing strength substantially greater than that of a water-quenched pellet of similar size and chemical composition.

8. A mechanically strong spherical pellet substantially solid throughout composed principally of crystalline aluminous material and comprising a minor percentage of an alkali oxide, the size of the crystals of said pellet being such that the crystalline character of said pellet can be readily identified, and further characterized by having a crushing strength substantially greater than that of a water-quenched pellet of similar size and chemical composition.

9. A batch of granules composed of alumina and containing a minor percentage of an alkali oxide, each granule being substantially spherical, solid throughout and having a crushing strength substantially greater than that of a water quenched granule of similar size and composition.

10. A batch of granules composed of crystalline refractory oxides and including a minor percentage of an alkali oxide, each granule being substantially spherical, solid throughout and having a crushing strength substantially greater than that of a water quenched granule of similar size and composition.

11. A mechanically strong, substantially spherical pellet substantially solid throughout composed of interlocking crystals of refractory oxides well knit together and including a minor percentage of an alkali oxide.

12. Substantially spherical pellets of crystalline refractory oxides, substantially solid throughout, and containing 1-10% of an alkali metal oxide, which pellets have been produced by projecting small droplets of the molten material into the air and maintaining them suspended in the air until they are completely solidified.

13. Substantially spherical pellets of crystalline aluminous material, substantially solid throughout, and containing 1-10% of an alkali metal oxide, which pellets have been produced by projecting small droplets of molten aluminous material into the air and maintaining them suspended in the air until they are completely solidified.

14. In the process of making mechanically strong, spherical pellets of refractory crystalline oxides, substantially solid throughout, the steps which comprise making a melt of said oxides containing a minor percentage of an alkali oxide, maintaining the melt so that it is substantially free from silica in excess of that required to form crystalline silicates with the other oxides present, projecting droplets of the molten material into the air and maintaining them suspended in the air until they are solidified and substantially cooled.

15. A substantially spherical pellet, substantially solid throughout, composed of crystalline refractory oxides free from silica in excess of that required to form crystalline silicates with the other oxides present and comprising 1 to 10% of an alkali oxide, which pellet has been produced by projecting a molten droplet of said composition into the air and allowing it to solidify completely while suspended in air.

16. A substantially spherical pellet of silica-free alumina, comprising 1 to 10% of an alkali oxide, thus rendering it substantially non-porous, which pellet has been produced by projecting a molten droplet of said composition into the air and allowing it to solidify completely while suspended in air.

17. A substantially spherical pellet, substantially solid throughout, composed of a member of the group of crystalline refractory oxidic materials consisting of alumina, magnesia, spinel, chromite and mullite and free from silica in excess of that required to form crystalline silicates with the other oxides present and comprising 1 to 10% of an alkali oxide, which pellet has been produced by projecting a molten droplet of said composition into the air and allowing it to solidify completely while suspended in air.

RAYMOND C. BENNER.
JOHN CHARLES McMULLEN.